Patented Nov. 20, 1934

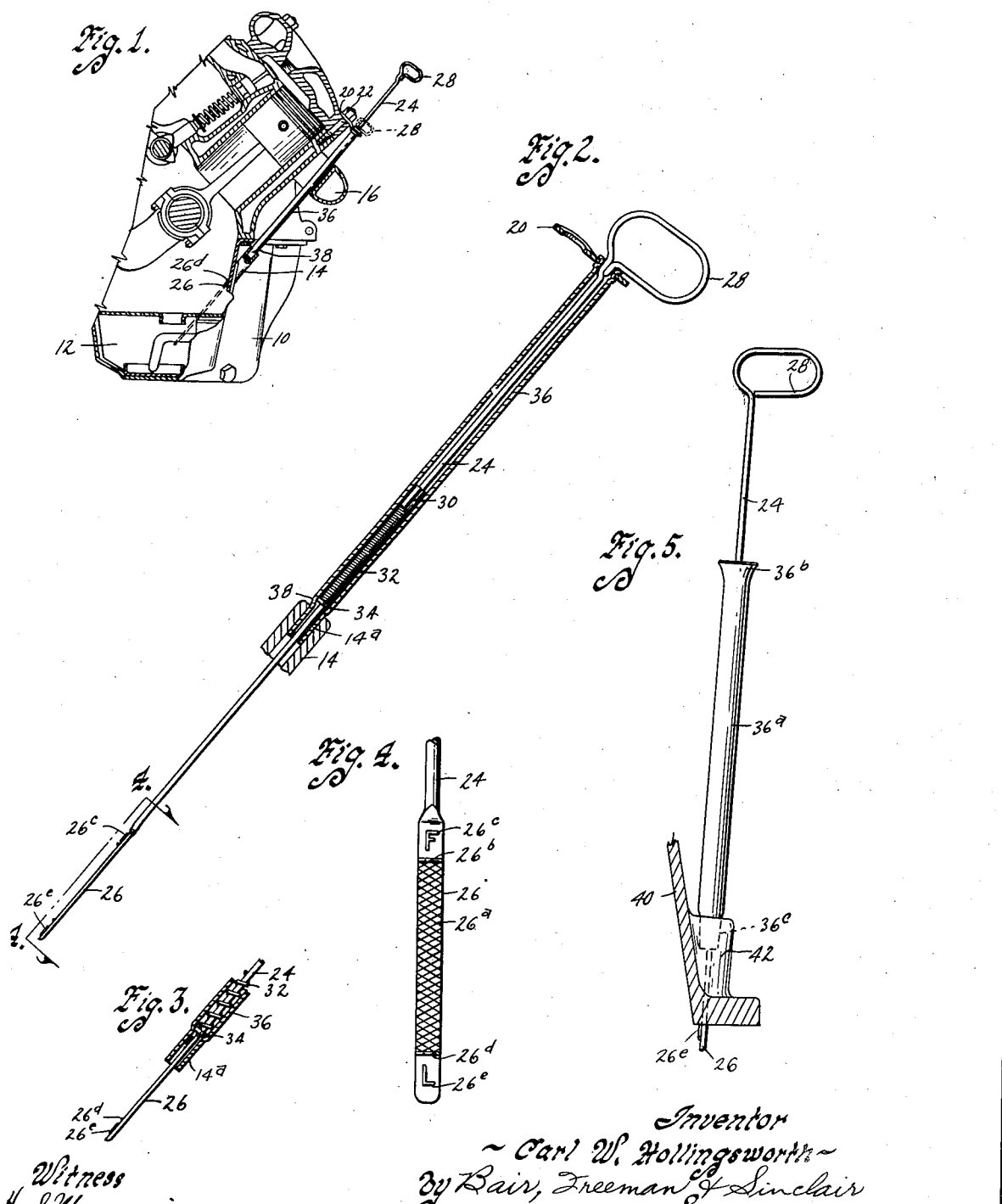

1,981,270

UNITED STATES PATENT OFFICE 1,981,270

WIPELESS OIL GAUGE

Carl W. Hollingsworth, Marshalltown, Iowa

Application November 20, 1933, Serial No. 698,817

5 Claims. (Cl. 73—120)

The object of my invention is to provide a wipeless oil gauge which is simple, durable and comparatively inexpensive to manufacture.

A further object is to provide an oil gauge for automobile engines and the like which does not have to be withdrawn, wiped, reinserted and then again withdrawn in order to determine the oil level, but can be merely withdrawn for this purpose.

Still another object is to provide, especially for an engine having a gauge opening which is difficult of accessibility, a gauge in an easily accessible position and having constructional details which make it possible to retain the gauge rod in raised position out of the oil in the engine except when it is manually forced down for gauging purposes.

With these and other objects in view my invention consists in the construction, arrangement and combination of the various parts of my device, whereby the objects contemplated are attained, as hereinafter more fully set forth, pointed out in my claims and illustrated in the accompanying drawing, in which—

Figure 1 is a partial vertical, transverse, sectional view of an automobile engine showing my invention applied thereto.

Figure 2 is an enlarged sectional view of the oil gauge in gauging position.

Figure 3 is a view of a portion of Figure 2 showing the gauge in non-gauging position.

Figure 4 is a face view of the lower end of the gauge rod; and

Figure 5 illustrates a modified form of the invention.

In Figure 1 an automobile engine is shown having a crank case 10 and a compartment 12 therein in which the crank case oil normally seeks a level. A hollow gauge rod boss 14 is formed on the crank case 10 and ordinarily a gauge rod is thrust into the boss 14 and has its lower end submerged in the oil within the compartment 12. On the particular type of engine illustrated, a manifold 16 is in such position with relation to the boss 14 that it is extremely difficult to see the opening in the boss when inserting the gauge rod. Especially is this true if there is not a good light coming from the right hand of Figure 1 and falling on the boss 14.

My invention contemplates the provision of an oil gauge which overcomes the objections just enumerated and also the objection that the rod must be withdrawn, wiped, reinserted and then again withdrawn in order to determine the oil level.

My wipeless oil gauge includes a guide tube 36 having a reduced lower end 14a provided with a shoulder 38, the reduced end being insertable in the boss 14 as best shown in Figure 2. The upper end of the tube 36 is provided with a perforated bracket 20 which can be connected with the engine as for instance by removing one of the engine head bolts 22 as shown in Figure 1 and reinserting it through the bracket. Thus the guide tube 36 is rigidly supported at its lower and upper ends with respect to the engine and the upper end is in a position which can be readily seen as compared with the boss 14, which is quite effectively hidden by the manifold 16.

Within the guide tube 36 I provide a gauge rod 24 having an oil level indicating end 26 and a handle portion 28. The handle portion 28 has its major portion on one side of the axis of the rod 24 so that, due to the rod 24 in its normal position being inclined, the oil level indicating end 26 will be in the natural position for observation when the handle 28 is engaged by the operator for withdrawing the gauge rod to determine the oil level.

The indicating end 26 preferably has embossed thereon the characters indicated at 26c and 26e, indicating respectively a full and a low condition of the oil within the crank case 10. Lines 26b and 26d can be embossed for indicating the levels "F" and "L". I also preferably provide knurling 26a on the face of the portion 26. The knurling is preferably embossed rather than cut into the metal.

Surrounding the gauge rod 24 is a normally extended spring 32 having a washer 34 at one of its ends and confined between this washer and a collar 30. The collar 30 may be a split tube pressed into the proper position on the gauge rod 24. The washer 34 is normally adapted to engage the upper end of the portion 26 of the rod 24, as shown in Figure 3.

In some types of installations, brackets 20 or the like will be necessary. In other installations, as for instance, in Figure 5, the guide tube 36a may be reduced and tapered as at 36c and this portion driven into the gauge rod boss 42 of the crank case 40. This connects the tube 36a rigidly with the boss 42 and no other connection is then required.

The upper end of the tube 36a may be flared as at 36b if desired to facilitate entry of the oil level indicating end 26 of the gauge rod 24 thereinto. The handle 28 may be of slightly different shape, as shown in this figure.

Practical operation

In the operation of my wipeless oil gauge, the handle 28 can be grasped and forced downwardly to the dotted line position of Figure 1, or the position of Figure 2. The indicating end 26 is normally almost entirely within the boss 14, it being normally retained in this position by engagement of the washer 34 of the spring 32 with the shoulder 28 of the tube 36. The spring is normally extended as in Figure 3 thus forcing the collar 30 and the rod 24 upwardly as far as the upper end of the indicating portion 26 will permit by reason of its engagement with the washer 34 as shown in Figure 3. Therefore when the rod is forced downwardly until the handle 28 strikes its upper end, which acts as a stop, the rod may then be withdrawn and the oil level will be indicated thereon without the necessity of having to wipe the gauge, reinsert it and again withdraw it. The knurling 26a tends to retain the oil on the rod better so as to give a more accurate reading.

Aside from the wipeless feature of my gauge, the tube 36 acting as an extension from the existing gauge rod opening on the automobile engine, provides a point of insertion for the gauge rod which is much more accessible and more easily seen, to therefore facilitate insertion of the gauge rod into the crank case.

Due to the greater ease of operation as compared with the types of oil gauge rods now in use, the owner of the automobile is more likely to check his oil oftener which of course is better for the operation of the engine. Thus my invention encourages better care of the engine of an automobile.

Some changes may be made in the construction and arrangement of the parts of my device without departing from the real spirit and purpose of my invention, and it is my intention to cover by my claims, any modified forms of structure or use of mechanical equivalents which may be reasonably included within their scope.

I claim as my invention—

1. In a wipeless oil gauge, an elongated tube for association with a gauge opening of an engine or the like, a shoulder adjacent the lower end thereof, a gauge rod for insertion in said tube and a spring surrounding said gauge rod, supported thereby and adapted to have its lower end engage said shoulder to normally support said gauge rod in position above the oil to be gauged.

2. In a wipeless oil gauge, an elongated tube for association with a gauge opening of an engine or the like, a shoulder adjacent the lower end thereof, a gauge rod for insertion in said tube and a spring surrounding said gauge rod and adapted to have the lower end engage said shoulder, said rod having an oil level indicating end, the lower end of said spring being normally thereadjacent whereby the oil level indicating end is positioned adjacent said shoulder, said spring being compressible by movement of said gauge rod downwardly for said oil level indicating end to enter the oil in the crank case of said engine whereby it will tend to return said gauge rod to normal position when released.

3. In a wipeless oil gauge, an elongated tube for association with a gauge opening of an engine or the like, a shoulder adjacent the lower end thereof, a gauge rod for insertion in said tube, a spring surrounding said gauge rod and adapted to have the lower end engage said shoulder, said rod having an oil level indicating end, the lower end of said spring being normally thereadjacent whereby the oil level indicating end is positioned adjacent said shoulder, said spring being compressible by movement of said gauge rod downwardly for said oil level indicating end to enter the oil in the crank case of said engine whereby it will tend to return said gauge rod to normal position when released and a stop for said gauge rod in its lower position.

4. In a wipeless oil gauge, an elongated tube for association with a gauge opening of an engine or the like, a shoulder adjacent the lower end thereof, a gauge rod for insertion in said tube, a spring surrounding said gauge rod and adapted to have the lower end engage said shoulder and a stop for said gauge rod when moved downwardly against the action of said spring.

5. For use with an engine or the like having a gauge rod opening, a tube adapted to have one end enter said opening and the other end to be spaced substantially thereabove, an abutment in said tube adjacent the first mentioned end thereof, a gauge rod insertable into and withdrawable from said tube, an abutment on said gauge rod and a spring interposed between said abutments to normally retain said gauge rod in raised position relative to said tube, said gauge rod being depressible relative to said tube against the action of said spring for causing the lower end thereof to enter oil in the crank case of said engine below said gauge rod opening.

CARL W. HOLLINGSWORTH.